United States Patent
Ragnarsson

(10) Patent No.: US 11,833,546 B2
(45) Date of Patent: Dec. 5, 2023

(54) IN-FEEDING AND RINSING DEVICE FOR GRADING SYSTEMS

(71) Applicant: Style EHF., Gardabaer (IS)

(72) Inventor: Egill Thor Ragnarsson, Gardabaer (IS)

(73) Assignee: STYLE EHF., Gardabaer (IS)

( * ) Notice: Subject to any disclaimer, the term of this patent is extended or adjusted under 35 U.S.C. 154(b) by 488 days.

(21) Appl. No.: 16/971,395

(22) PCT Filed: Feb. 20, 2019

(86) PCT No.: PCT/IS2019/050001
§ 371 (c)(1),
(2) Date: Aug. 20, 2020

(87) PCT Pub. No.: WO2019/162973
PCT Pub. Date: Aug. 29, 2019

(65) Prior Publication Data
US 2020/0391249 A1 Dec. 17, 2020

(30) Foreign Application Priority Data
Feb. 20, 2018 (IS) .......................................... 050211

(51) Int. Cl.
*B07B 13/16* (2006.01)
*B07B 13/07* (2006.01)
*A22C 25/04* (2006.01)
*A22C 25/08* (2006.01)
*B07B 13/065* (2006.01)
*B65G 15/22* (2006.01)
*B65G 21/20* (2006.01)
(Continued)

(52) U.S. Cl.
CPC .............. *B07B 13/16* (2013.01); *A22C 25/04* (2013.01); *A22C 25/08* (2013.01); *B07B 13/065* (2013.01); *B07B 13/07* (2013.01); *B65G 15/22* (2013.01); *B65G 21/20* (2013.01); *B65G 47/1421* (2013.01); *B65G 47/24* (2013.01); *B65G 2201/0202* (2013.01)

(58) Field of Classification Search
CPC ....... B07B 13/065; B07B 13/07; B07B 13/16; A22C 25/04; A22C 25/08; B65G 15/22; B65G 21/20; B65G 47/1421; B65G 47/24
USPC ......................................................... 209/247
See application file for complete search history.

(56) References Cited

U.S. PATENT DOCUMENTS

2012/0193272 A1* 8/2012 Greve ...................... B07B 1/15
209/244

FOREIGN PATENT DOCUMENTS

DE    102015211351 A1   12/2016
FR          592573 A      8/1925
(Continued)

OTHER PUBLICATIONS

International Search Report and Written Opinion dated Jun. 5, 2019 for corresponding International Application No. PCT/IS2019/050001.
(Continued)

*Primary Examiner* — Terrell H Matthews
(74) *Attorney, Agent, or Firm* — TAROLLI, SUNDHEIM, COVELL & TUMMINO L.L.P.

(57) ABSTRACT

In-feed device (1) for feeding objects onto a grading apparatus (13) for grading sensitive products. The in-feed device (1) comprises a new type of sliding plates (4, 5) and vibrating motors (7) to arrange the objects and to rinse small particles from the objects to be graded.

8 Claims, 4 Drawing Sheets

(51) Int. Cl.
*B65G 47/14* (2006.01)
*B65G 47/24* (2006.01)

(56) References Cited

FOREIGN PATENT DOCUMENTS

| | | | | |
|---|---:|---|---|---|
| FR | 776816 | A | | 2/1935 |
| GB | 1185079 | A | | 3/1970 |
| GB | 1268554 | A | | 3/1972 |
| GB | 1268554 | A | * | 3/1972 |
| GB | 2304103 | A | | 3/1997 |
| KR | 20120111816 | A | | 10/2012 |
| WO | 9641541 | A1 | | 12/1996 |
| WO | WO-9641541 | A1 | * | 12/1996 ........... B07B 13/065 |
| WO | 9848951 | A1 | | 11/1998 |
| WO | WO-9848951 | A1 | * | 11/1998 ............. A22C 25/04 |
| WO | 03043428 | A2 | | 5/2003 |
| WO | WO-03043428 | A2 | * | 5/2003 ........... A01K 61/001 |
| WO | 2005115155 | A1 | | 12/2005 |

OTHER PUBLICATIONS

Danish Search Report dated Jun. 6, 2018 for corresponding Icelandic Application No. 050211.

* cited by examiner

IN-FEEDING AND RINSING DEVICE FOR GRADING SYSTEMS

RELATED APPLICATIONS

The present application is a U.S. National Stage application under 35 USC 371 of PCT Application Serial No. PCT/IS2019/050001, filed on 20 Feb. 2019; which claims priority from IS Patent Application No. 050211, filed 20 Feb. 2018, the entirety of both of which are incorporated herein by reference.

FIELD OF INVENTION

The present invention relates to an in-feeding device for grading apparatuses, which are based on conveyor equipment with ridge-belts. The in-feeding device makes it possible to rinse and arrange the objects to be graded as they are fed onto the grading apparatus.

INTRODUCTION

The grading of objects such as shrimp and other marine species can be a difficult task. The reason being their small size and the volume to be processed at each time combined with that the quality of fish deteriorates quickly if not stored at sub-zero temperature. The grading therefore has to be highly efficient. The purpose of the grading is primarily to separate the species by size and/or sex.

WO9641541 discloses a grading device based on specially-designed conveyor equipment so-called ridge-belts, which move the objects forwards without shaking or rubbing the items during the grading process. Such grading devices are designed so that the grading channels are narrower at the in-feed end (receiving end) than at the outlet end. This device allows for more gentle treatment of the objects to be graded, with a high processing rate. This ensures that small items are not carried on top of larger items into a wrong grading compartment.

In order to ensure good grading by such grading machines an even delivery of objects at the in-feed end of the grading machine is important. This has been solved in different ways such as in WO 2003/043428 where an in-feed distributing unit is disclosed having a set-up of different components to distribute and feed items onto the grader. The in-feeding device comprises i) a slider having a planar surface inclined on a frame; ii) on ore more conveyors arranged below the slider for advancing the objects in the forward direction; and iii) dividing boards arranged in the conveying direction below the conveyor(s) and above the grading mechanism to ensure that the objects falling from the conveyor to the grading mechanism parallel to the conveying direction. This in-feeding device is ideal for fish like herring, mackerel, or capelin. The problem with items such as shrimp is that it often enters the in-feeding device in clumps including krill, antennas and other items, which are not desirable to have on the grader. Furthermore, due to the shape of shrimps, it has a tendency to enter the ridge belts in a sideways position and getting stuck on the ridge. It would be desirable to pre-arrange objects such as shrimp before they are distributed over the in-feed end of the ridge belt grader.

SUMMARY OF THE INVENTION

The present invention provides a device for feeding objects onto a grading apparatus, where the in-feeding device rinses small particles from the stream of objects and arranges them to be fed onto the grading apparatus. The in-feeding apparatus of the present invention is ideal for rinsing and arranging objects such as shrimp before feeding them onto a ridge belt grading conveyor. The in-feed device has a receiving tray and sliding plates which all have an inclined position and are attached to a vibrating unit, such that the receiving tray helps dissolving clumps of objects and the vibrations forces the objects to slide down the inclining sliding plates. An arrangement of ridge like elongated members with widening gap between them in the bottom of sliding plates facilitates arranging the objects in a certain position and rinsing away small particles such as krill and antenna from a catch of shrimps. The widening of the gap takes place over a short distance and ends in an opening where the object falls through onto a next sliding plate or onto the grading device in a desired position. The device of the present invention provides more efficient and accurate grading by arranging the objects before they enter the in-feed end of the grading apparatus and reduces mistakes in grading when the objects land on ridge belts of such grading conveyors. Furthermore, the value of the objects is increased by the rinsing function of the device of the present invention.

One problem with current in-feeding devices is that when grading objects such as shrimp, the shrimp may clump up during fishing and/or storing before the grading process. The vibrating function of the current invention solves this problem by dissolving such clumps in the receiving tray. Another problem is that when grading a large number of small objects, such as a catch of shrimps, a portion of the catch is krill and such catch may contain debris such as antennas and other things. The antennas have a tendency to fasten in other objects forming a cluster of objects and small objects such as sand, stones and antennas cause wear and jamming of mechanisms such as takeaway belts. Arrangement of ridge like elongated members with widening gap between them allows rinsing of the catch, where krill and debris falls through the gaps as the shrimp slide down the inclining sliding plate towards the opening of each plate. Yet another problem is that due to the shape of objects such as shrimp, they can get stuck on top of the ridges of a ridge belt grading conveyor if the fall sideways off the in-feeding device. The arrangement of ridge like elongated members with widening gap between them and the elongated opening at the out-feed end of the bottom of sliding plate allows objects such as shrimp to fall through onto a next sliding plate or onto the grading device in a longitudinal direction.

The present invention in useful in industry, not only for the purpose of enabling the currently existing equipment to operate at the ideal level of throughput, but also as a new standard of concentration control for which future devices can be designed to exploit.

It is an object of the present invention to overcome or ameliorate the aforementioned drawbacks of the prior art and to provide an improved and/or alternative and/or additional device for feeding objects onto a grading apparatus. Moreover, it is a preferred object of the present invention to provide an in-feeding device for feeding, rinsing and arranging an uneven stream of individual objects onto a ridge belt grading apparatus. It is also a preferred object of the present invention to provide a method for feeding an uneven stream of individual objects onto a ridge belt grading apparatus using an arrangement of ridge like elongated members with widening gap between them to rinse and arrange objects in a desired position before they are fed onto a grading apparatus.

The object(s) underlying the present invention is (are) particularly solved by the features defined in the independent claims. The dependent claims relate to preferred embodiments of the present invention. Further additional and/or alternative aspects are discussed below.

In some embodiments of the present invention, the following features may be employed: a) use of a receiving tray and sliding plates which are arranged in an inclined position and are attached to a vibrating unit, b) by an arrangement of ridge like elongated members with widening gap between them in the bottom of the sliding plates to facilitate arranging the objects in a certain position and rinsing away small particles or debris from the objects to be graded, and/or c) ensuring that the widening of the gap between the ridge like elongated members occurs over a short distance and ending in an elongated opening so that the objects will fall onto the next sliding plate or the grading device in a desired position.

The grading device as such is disclosed in WO9641541 and will not be discussed in detail herein.

Thus, at least one of the preferred objects of the present invention is solved by an in-feed device for feeding, rinsing and arranging an uneven stream of individual objects onto a grading apparatus. The in-feed device comprises i) a frame, ii) a receiving tray, iii) one or more sliding plates each sliding plate having an in-feed end and an out-feed end, wherein each sliding plate further comprises a ridged bottom surface and a gap between each ridge and iv) one or more vibrating units attached to the frame. The receiving tray and the one or more sliding plates are attached to the vibrating unit in an inclined position. Furthermore, the gap between each ridge increases in width from the in-feeding end towards the out-feeding end and wherein the last portion of each gap widens to form an opening in the bottom surface for rinsed and arranged objects to fall through.

In an embodiment of the present invention the ridged bottom surface the one or more sliding plates is formed by elongated ridge members.

In an embodiment of the present invention the degree of incline of the sliding plates is set based on the items or objects to be graded.

In an embodiment of the present invention the lowest sliding plate of the one or more sliding plates has a stopping member.

In an embodiment of the present invention the further comprising a plurality of dividing boards extended side-by-side substantially perpendicular to the conveying direction arranged in-between said grading means and its nearest adjacent conveyor adapted to ensure that the objects falling from said nearest adjacent conveyor to said grading means lie parallel to the conveying direction.

In an embodiment of the present invention the each respective dividing board is substantially parallel to the conveying direction.

In an embodiment of the present invention the object is marine species such as shrimps.

In one embodiment each gap between each ridge increases in width from the in-feeding end towards the out-feeding end from between 4 to 9 mm, such as 5 to 7.5 mm, before each gap widens to form an opening in the bottom surface for rinsed and arranged objects to fall through.

In an embodiment of the present invention the grading apparatus comprises a plurality of endless ridge-belts arranged side by side and moved continuously in a forward direction, forming a gap there in-between, the ridge-belts being longitudinally supported by plurality of guide rails and one or more adjusting device being arranged underneath said ridge-belts and supporting guide rails, for adjusting the distance between said ridge-belts.

Another preferred objects of the present invention is solved by a method for feeding, rinsing and arranging an uneven stream of individual objects onto a grading apparatus. The method comprises the steps of i) feeding the objects to be graded onto a receiving tray arranged above, and together with one or more sliding plates in connection with one or more vibrating units, where each sliding plate has an in-feed end and an out-feed end, and wherein each sliding plate further comprises a ridged bottom surface and a gap between each ridge, ii) providing a vibration to the receiving tray and the one or more sliding plates, iii) arranging the receiving tray and the one or more sliding plates are arranged an inclined position in a functional connection to the vibrating unit, and iv) arranging the plurality of elongated ridge members in the bottom of each sliding plate such that the gap between each ridge increases in width from the in-feeding end towards the out-feeding end for sorting out debris and small particles, wherein the last portion of each gap widens to form an opening in the bottom surface for rinsed and arranged items to fall through.

In an embodiment of the present invention the method further comprises arranging a plurality of dividing boards arranged in-between said in-feed device and its nearest adjacent ridge belt of a grading conveyor adapted to ensure that the objects falling from said nearest adjacent conveyor to said grading means lie parallel to the moving direction of said grading means.

In one embodiment the method provides means for grading of sensitive products on an endless ridge-belt conveyor where the endless ridge-belts are arranged side by side and moved continuously in a forward direction, forming a gap there in-between, the gap being increased in the direction of movement, two adjacent belts receiving, conveying and releasing the products as the gap there between becomes greater than the product thickness into the receiving units, the ridge-belts being longitudinally supported by plurality of guide rails, and one or more adjusting device/unit(s) arranged underneath the ridge-belts and supporting guide rails. An in-feed device is provided for feeding, rinsing and arranging an uneven stream of individual objects onto a grading apparatus. Rinsing, arranging and in-feeding is facilitated by i) arranging the functional parts of the in-feed device in an inclined position in the frame, where the frame is attached to the one or more vibrating units to provide vibration to both the receiving tray and the one or more sliding plates, and ii) arranging the elongated ridge members in the bottom surface of the receiving plates such that the gap between each ridge increases in width from the in-feeding end towards the out-feeding end and wherein the last portion of each gap widens to form an opening in the bottom surface for rinsed and arranged objects to fall through.

At least another preferred objects is solved by an a) apparatus for grading of sensitive products, comprising a plurality of endless ridge-belts arranged side by side and moved continuously in a forward direction, forming a gap there in-between, the gap being increased in the direction of movement, two adjacent belts receiving, conveying and releasing the products as the gap there between becomes greater than the product thickness into the receiving units, the ridge-belts being longitudinally supported by plurality of guide rails, and one or more adjusting device/unit(s) arranged underneath the ridge-belts and supporting guide rails, the adjusting device being arranged for adjusting the distance between the ridge-belts, and b) an in-feed device for feeding, rinsing and arranging an uneven stream of individual objects onto a grading apparatus. The in-feed device comprises i) a frame, ii) a receiving tray, iii) one or more sliding plates each sliding plate having an in-feed end and an out-feed end, wherein each sliding plate further comprises a ridged bottom surface and a gap between each ridge and iv) one or more vibrating units attached to the frame. The receiving tray and the one or more sliding plates are attached to the vibrating unit in an inclined position. Furthermore, the gap between each ridge increases in width from the in-feeding end towards the out-feeding end and wherein the last portion of each gap widens to form an opening in the bottom surface for rinsed and arranged objects to fall through. The receiving tray and the one or more sliding plates are arranged in frame, where the frame is attached to the one or more vibrating units to provide vibration to both the receiving tray and the one or more sliding plates. The ridged bottom surface the sliding plates is formed by elongated ridge members and the lowest sliding plate of the one or more sliding plates has a stopping member to force the items to fall through the opening in the bottom surface in order to allow the objects to enter the grading apparatus in an appropriate position.

In the present context the term "functional parts" of the adjusting device relates to the functional parts of the support members, the adjusting screwing members and the adjusting screwing shaft. Furthermore, the functional portions of these parts are the i) screw threads and the interaction between the screw threads, ii) the hollow structure of the adjusting screwing members and adjusting screwing shaft and more specifically the gripping portion of the hollow structure and the gripping means of the shaft formed by the shape of the hollow structure and the cross section of the shaft, and iii) the shape of the recess in the of the guide section of the support member and the cross section of the guide member of the guide bar.

In the present context the terms "adjusting device" or "adjusting unit" are used for the setting or adjusting device of the invention, which is placed under the guide rails and the running ridge belts of a grading machine to adjust or set the gap between the belts of the grading apparatus.

The gap size between the ridge belts is then set by using the control board, which can be a simple electrical control board attached to the grading device, having control buttons which rotate the adjusting screwing shaft in each direction as well as controlling the speed of the grading device and the in-feed device. The control board can further be a wireless remote control or an industrial computer, which co-ordinates the turning of the adjusting screwing shaft by the motor and the pressure applied by the pressure means.

An adjustment device as disclosed here is implemented on the in-feed end as well as on the outlet end of the grading device and as they are individually controlled, the gap width of each end can be altered without affecting the other.

BRIEF DESCRIPTION OF DRAWINGS

The present invention will be further described with reference to the drawings using reference numbers in the drawings to identify the individual components of the invention.

DETAILED DESCRIPTION OF THE PRESENT INVENTION

In the following, exemplary embodiments of the invention will be described, referring to the figures. These examples are provided to provide further understanding of the invention, without limiting its scope.

In the following description, a series of steps are described. The skilled person will appreciate that unless required by the context, the order of steps is not critical for the resulting configuration and its effect. Further, it will be apparent to the skilled person that irrespective of the order of steps, the presence or absence of time delay between steps, can be present between some or all of the described steps.

Figure 1:
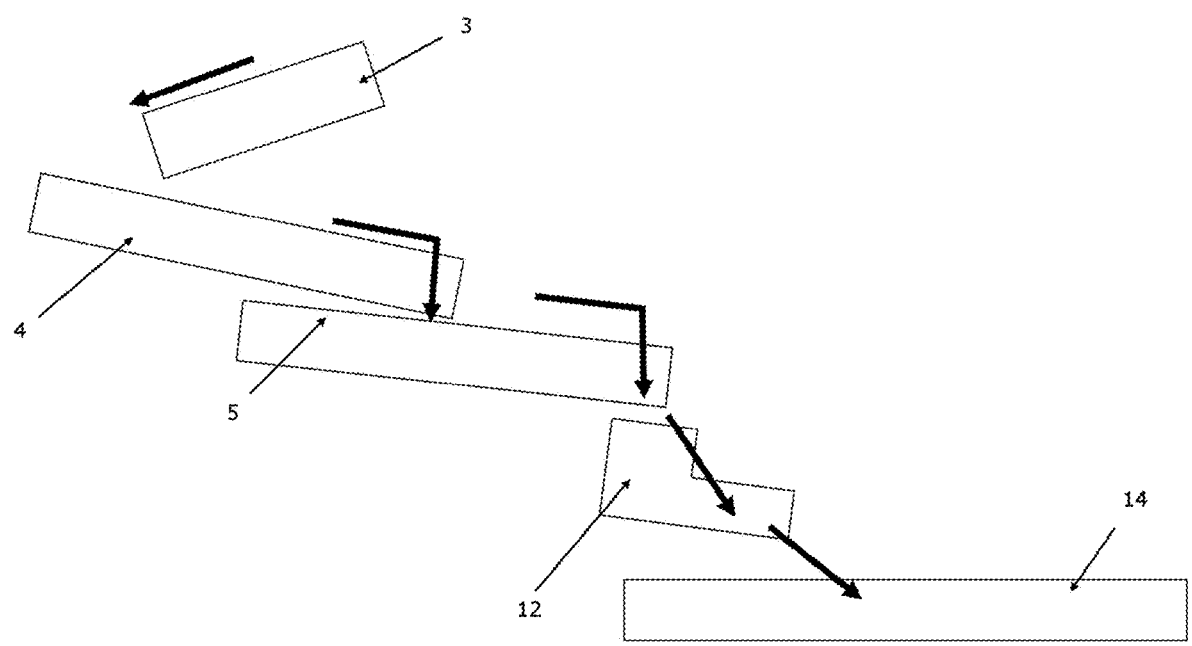
FIG. 1 shows the individual components of the in-feeding device of the present invention.

FIG. 1 shows a schematic side view of the components of the in-feed device of the present invention and the arrow indicate the direction of the material going through the device. The material is fed onto a receiving tray 3, which is in an inclined position towards the in-feed end of the first sliding plate 4. The material flows in the direction towards the grading apparatus on the first sliding plate 4, also being in an inclined position, through the opening and onto the in-feed end of the second sliding plate 5. The Material then slides downwards the second sliding plate 5 and through the opening and onto the dividing board 12 and therefrom onto the ridge-belts 14 of the grading apparatus.

Figure 2:
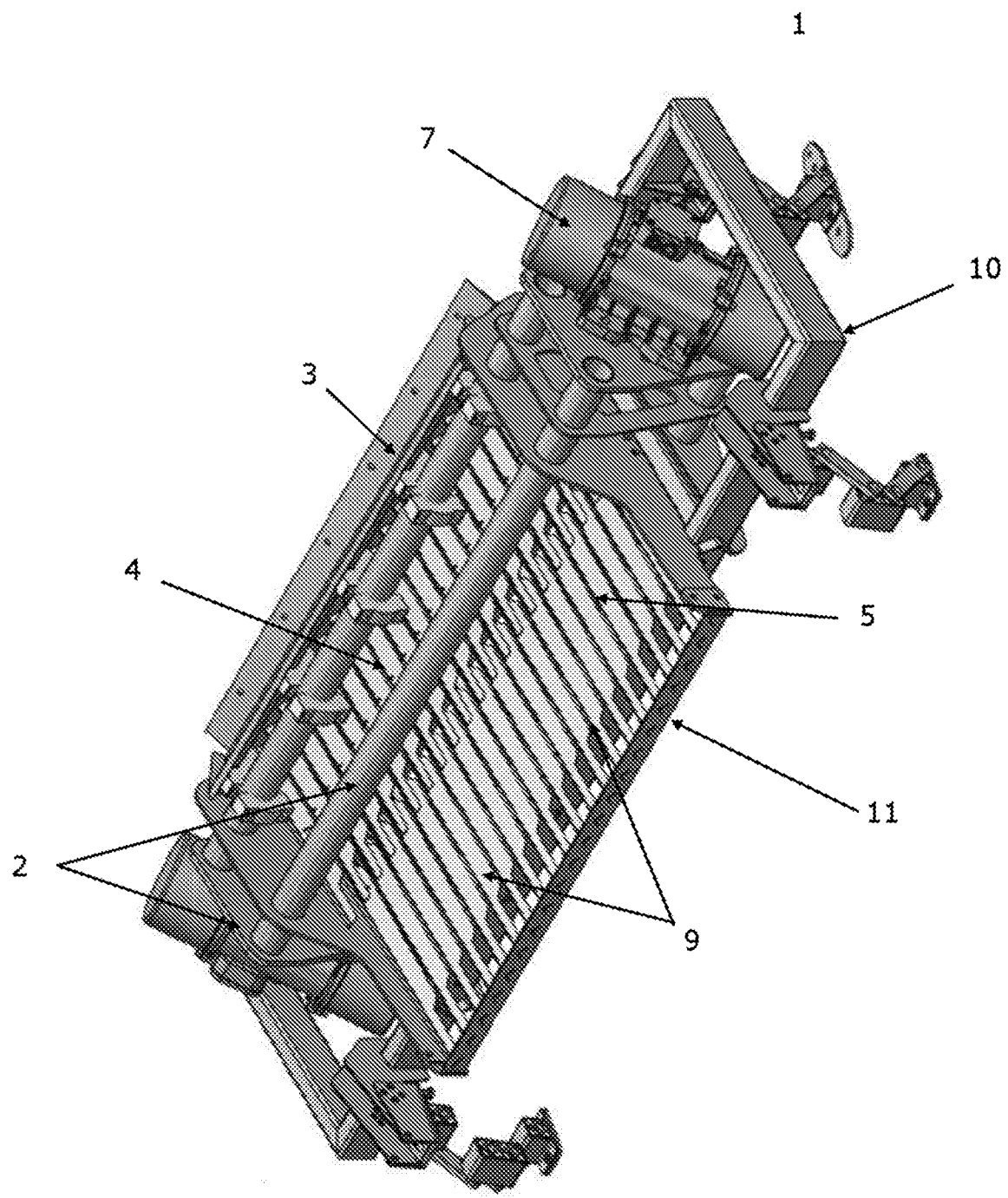
FIG. 2 shows a side view (A) of the grading apparatus and the in-feeding device. A top view (B) of the same equipment.

FIG. 2 shows a side-view of the in-feeding and device in front and above a grading device (13). In FIG. 2A the objects to be graded are placed onto an in-feed device and as the objects slide downwards, they assume the optimal position before sliding onto the ridge-belts (14). The ridge-belts (14) run along guide-rails (15) and the guide-rails (15) rest on the adjusting device (16) attached to an adjusting screwing shaft. The number of ridge-belts may be from 2 to over 30 according to the processing rate required of the grader. The guides are shown with an upward incline in the figure, but they may be horizontal or inclined downwards, depending on what is found suitable at any given time. Between the ridge-belts (14) are formed the grading gaps, the number of which is one fewer than the number of ridge-belts. Below the ridge-belts (14) are cross-plates (17) for guiding and dividing graded objects between size categories. The ridge-belts (14) as driven by the drive drum (18), frictional resistance between the drum and the belts being sufficient to drive the belts; if it is not sufficient, e.g. in the case of long machines or heavy items, then the drum is covered with object with a high friction resistance or with pins which engage in the ridges and so drive them. Drum (19) is a free drum which guides the belts into the guide slots in the belt guides.

In FIG. 2B, a light-construction grading machine seen from above, showing the motor (20) which drives the drive drum. It is desirable that the motor should be speed-adjustable, but whether it is a hydraulic motor or an electric motor is immaterial. A gear motor may be used after the machine has been set and the object to be graded is always of the same type. FIG. 1B shows a grading machine (13) with ridge belts (14), where the gap between the belts at the in-feed end below the in-feed device (1) is smaller than at the outfeed end.

Figure 3:
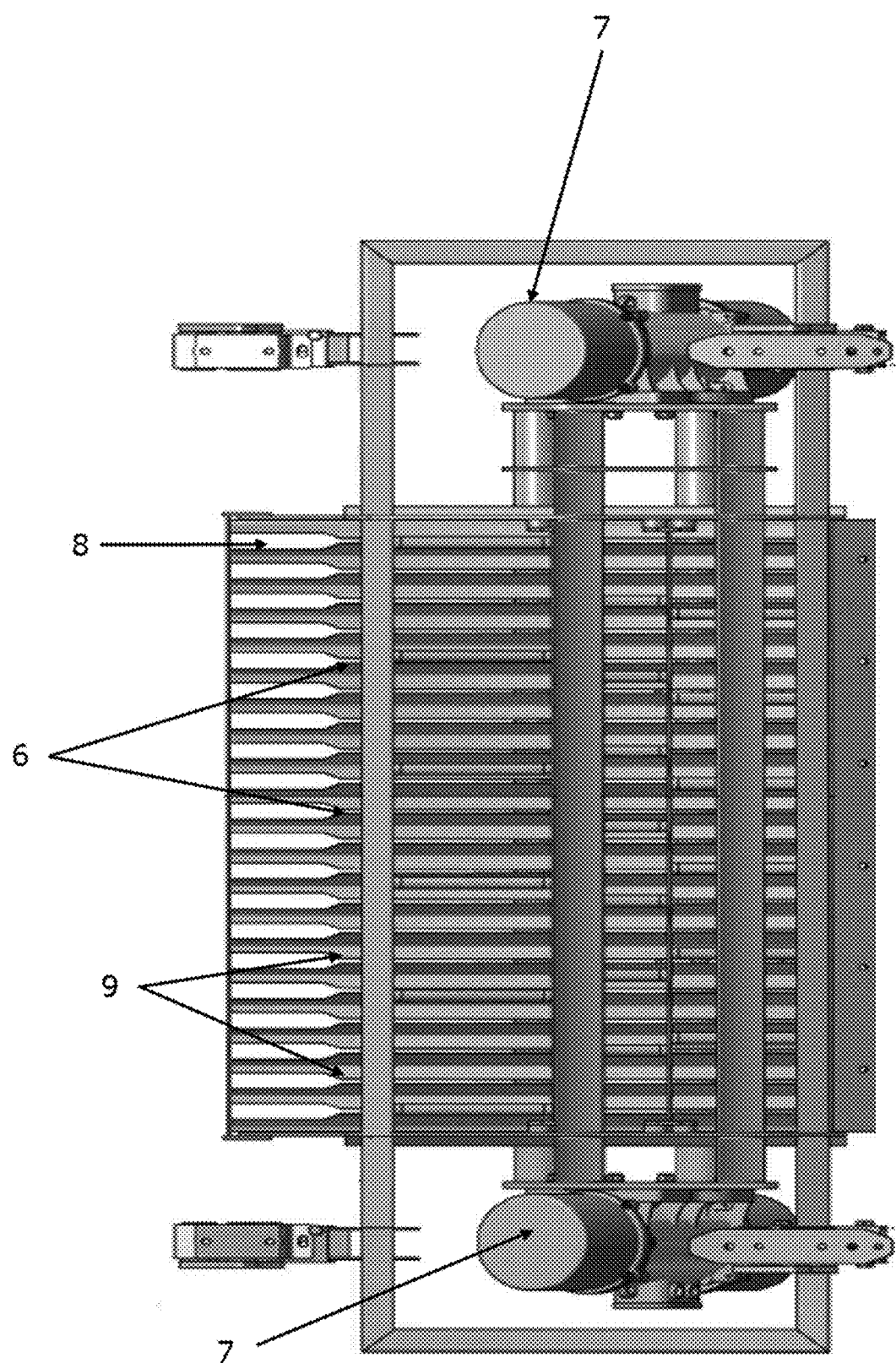
FIG. 3 shows a perspective drawing of the in-feed device of the present invention.

FIG. 3 is a perspective drawing of the in-feed device 1 of the present invention. The components of the device are arranged in a frame 2. The drawing also shows an outer frame 10, which is not required for the invention to work. The receiving tray 3 and the sliding plates 4, 5 are attached to the vibrating unit in an inclined position. The figure shows how each sliding plate has a ridged bottom surface, made from a plurality of elongated ridge members 9.

Figure 4:
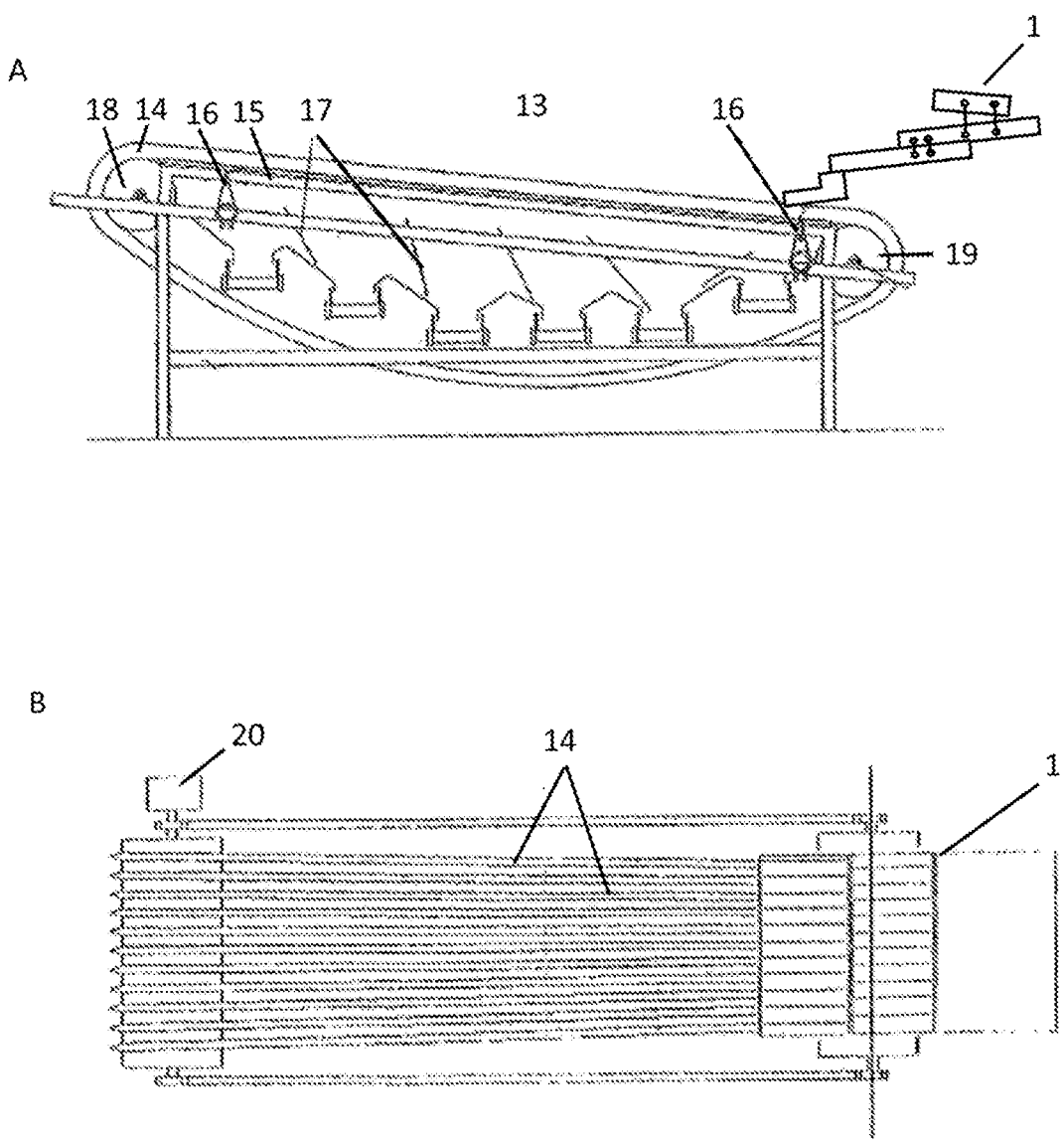
FIG. 4 shows a top view of the in-feed device of the present invention.

FIG. 4 is a top view of the in-feed device 1 of the present invention outlining the arrangement of the elongated ridge members 9. There is a gap 6 between each ridge member 9, where that the gap 6 between each ridge increases in width from the in-feeding end towards the out-feeding. In the last portion of each two ridge members 9, the gap widens to form an opening 8 in the bottom surface, where the rinsed and arranged objects to fall through, either onto the next sliding plate or onto the dividing boards.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

The invention claimed is:

1. An in-feed device for feeding, rinsing and arranging an uneven stream of individual objects onto a grading apparatus, wherein the in-feed device comprises:
    a frame;
    a receiving tray;
    one or more sliding plates each having an in-feed end, an out-feed end, a ridged bottom surface, and a gap between each of the ridged bottom surfaces; and
    one or more vibrating units attached to the frame, wherein the receiving tray and the one or more sliding plates are attached to the one or more vibrating units in an inclined position, wherein the gap between each of the ridged bottom surfaces increases in width from the in-feed end towards the out-feed end, wherein a last portion of each gap widens to form an opening in the ridged bottom surface for rinsed and arranged objects to fall through, and wherein a lowest sliding plate of the one or more sliding plates has a stopping member.

2. The in-feed device according to claim 1, wherein the ridged bottom surface of the one or more sliding plates is formed by elongated ridge members.

3. The in-feed device according to claim 1, wherein the grading apparatus comprises a plurality of ridge belts arranged side by side and moved continuously in a forward direction, forming a gap there in-between, the ridge-belts being longitudinally supported by a plurality of guide rails and one or more adjusting devices being arranged underneath the ridge belts and supporting plurality of guide rails, for adjusting the distance between the ridge belts.

4. The in-feed device according to claim 3, further comprising a plurality of dividing boards extended side-by-side substantially perpendicular to the forward direction arranged inbetween the grading apparatus and the in-feed device adapted to ensure that the objects falling from the in-feed device to the grading apparatus lie parallel to the forward direction.

5. The in-feed device according to claim 4, wherein each of the plurality of dividing boards is substantially parallel to the forward direction.

6. The in-feed device according to claim 1, wherein the objects are marine species comprising shrimps.

7. A method for feeding, rinsing and arranging an uneven stream of individual objects onto a grading apparatus, the method comprising:
    feeding the objects to be graded onto the receiving tray of claim 1;
    providing a vibration to the receiving tray and the one or more sliding plates, wherein the receiving tray and the one or more sliding plates are arranged in an inclined position in a functional connection to the one or more vibrating units, and
    wherein the gap between each of the ridged bottom surfaces increases in width from the in-feed end towards the out-feed end for sorting out debris and small particles and wherein the last portion of each gap widens to form an opening in the ridged bottom surface for rinsed and arranged items to fall through, and
    wherein a stopping member on a lowest sliding plate of the one or more sliding plates forces the objects to fall through the opening in the ridged bottom surface.

8. The method according to claim 7, further comprising arranging a plurality of dividing boards in between the in-feed device and the grading apparatus adapted to ensure that the objects falling from the in-feed device to the grading apparatus lie parallel to the moving direction of the grading apparatus.

\* \* \* \* \*